Sept. 4, 1928.
W. A. ALLEN
1,683,433
DEVICE FOR CONTROLLING RADIATOR SHUTTERS
Filed Jan. 8, 1926
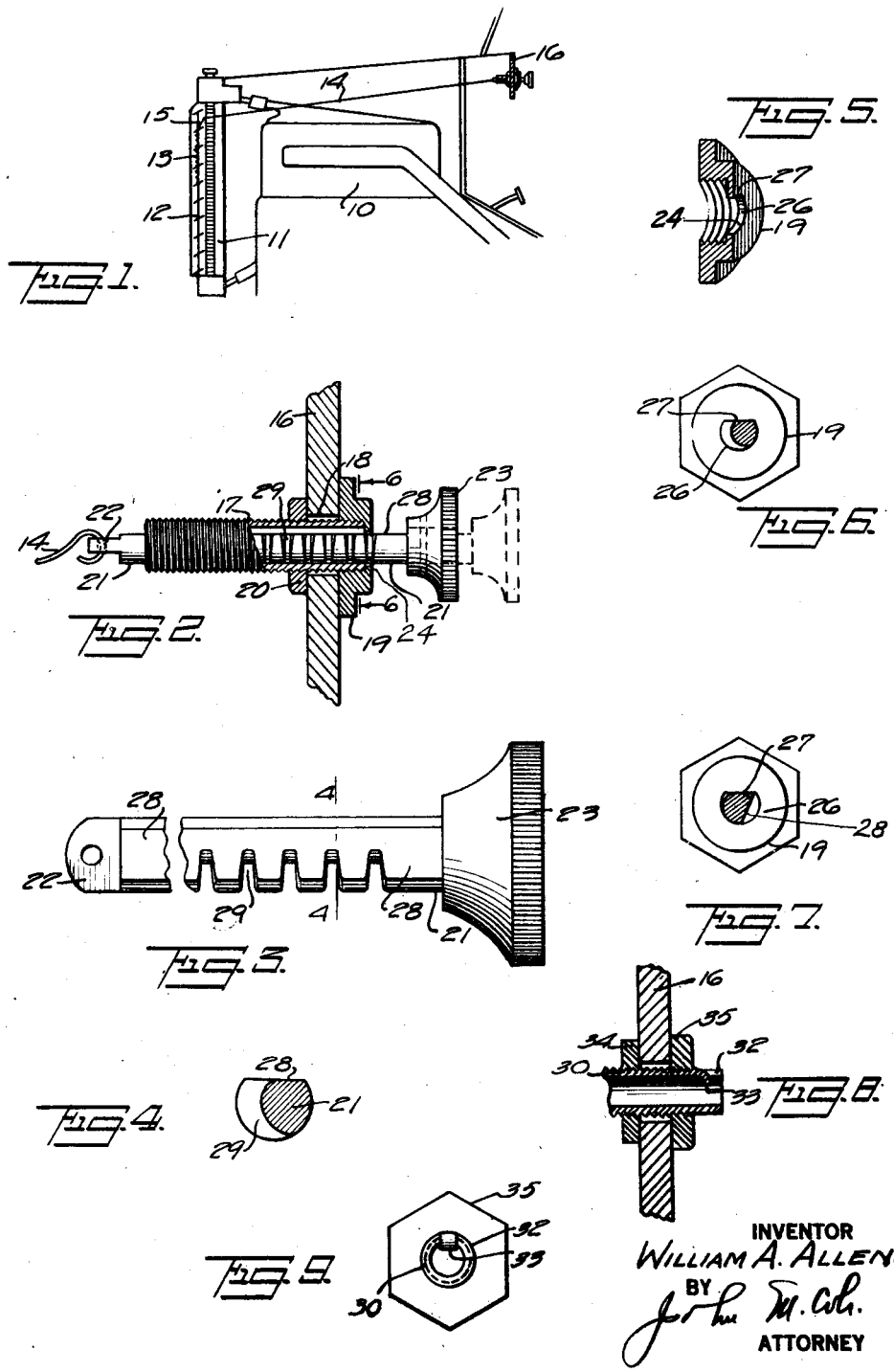
INVENTOR
WILLIAM A. ALLEN.
BY
ATTORNEY Patented Sept. 4, 1928.

1,683,433

UNITED STATES PATENT OFFICE.

WILLIAM A. ALLEN, OF NEW YORK, N. Y.

DEVICE FOR CONTROLLING RADIATOR SHUTTERS.

Application filed January 8, 1926. Serial No. 79,968.

The present invention relates to devices for controlling radiator shutters, and is more particularly directed toward a device suitable for manually controlling a radiator shutter, and for mounting on the instrument board of an automobile.

Radiator shutters, mounted in front of the radiator of an automobile vehicle, are held closed by a spring or springs, and may, in the case of hand operated shutters, be opened by a device carried by the instrument board and suitably connected to it. For the most satisfactory operation of the engine, it is desirable that one should be able to adjustably control the amount of opening of the shutter so as to vary the cooling effect of the radiator. It is therefore desirable that the dash board instrument should be adjustable to permit varying the amount of this opening.

Since the spring which tends to close the shutter applies a tension to the wire or other member connecting the shutter to the device carried by the instrument board, it is of course obvious that a control device must be provided with suitable means to hold the parts in position notwithstanding the pull of the spring. Various forms of ratchets using spring pressed members have been suggested for the purpose, but these devices are liable to become loose and noisy as well as to excessive and rapid in wear, so that they become inefficient in use. The vibration of the vehicle is such that it is necessary to provide a very secure device which is not likely to become unloosened accidentally, for in this case the spring quickly closes the shutters.

The present invention therefore contemplates providing a control device for the purposes above referred to, in which one may readily adjust the shutter to various openings and lock the parts so that they cannot become accidently loosened by the vibration of the vehicle. It also contemplates the elimination of looseness of parts which might rattle and of all springs or ratchets, which are likely to wear.

Where automobiles are equipped by the manufacturer with shutters of the type above referred to, I have found it desirable to avoid a control whose operation is not obvious to the ordinary user, and therefore, according to the present invention, there is provided a control the operation of which may be observed by the user.

The most convenient embodiment of the invention utilizes a reciprocatory plunger, and I have found it advisable to provide the plunger with suitable notches, which may be readily observed from the driver's seat, when pulled to open the shutter. One seeing these notches will readily understand the operation of the device and will instinctively know what to do to adjust the shutter. The operator may, therefore look at the control device at any time, and when he knows the condition of the control device and the manner in which this device affects the shutter, he pays more careful attention to the cooling of the engine, obtains the advantages of better cooling, and his confidence in the usefulness of the device is greatly increased.

Other and further objects of the invention will appear as the description proceeds.

The accompanying drawings show, for purposes of illustrating the invention, two of the many possible embodiments in which it may take form, it being understood that the drawings are illustrative of the invention which may be embodied in various additional forms.

In these drawings:

Figure 1 is a fragmentary, diagrammatic view of the front of an automobile, showing the apparatus installed;

Figure 2 is a vertical sectional view through the instrument board, showing the control device mounted thereon, the plunger being in position to be moved either longitudinally or angularly;

Figure 3 is an enlarged top plan view of the plunger;

Figure 4 is a section of the line 4—4 of Figure 3;

Figure 5 is a fragmentary perspective view of a part;

Figure 6 is a sectional view on the line 6—6 of Figure 2;

Figure 7 is a view similar to Figure 6, showing the parts turned to the locking position; and Figures 8 and 9 illustrate a modified form of guide tube.

Figure 1 diagrammatically illustrates an automobile engine 10 having a radiator 11 in front of which is mounted a shutter 12. This shutter is held closed by spring 13 in the usual manner, and is adapted to be opened by a wire or other device 14 connected to a lever 15 carried by the shutter. The member 14 extends through an opening in the radiator and is carried back toward the instrument board 16 where it is connected to the improved control device.

As here shown, a threaded guide tube 17 is passed through a hole 18 in the instrument board. This guide tube is clamped in place by means of a nut 19 threaded onto the front end of the tube and by a nut 20 threaded onto the tube from the rear. A plunger 21 is slidably carried in the guide tube, and is connected at the end 22 in a suitable manner with the wire 14. The other end of the plunger 21, is provided with a suitable grip 23 so that the operator may pull the plunger to open the shutter.

According to the present invention, suitable cooperative devices are carried by the stationary guide tube and the movable plunger for locking the plunger is in selected positions. According to the invention, the plunger is to be freely reciprocable when in one angular position, and capable of partial rotary movement in selected positions along its axis to lock it against reciprocatory movement. While there are many forms and constructions to carry out this operation, the present showing illustrates a convenient construction for the purpose. To provide for reciprocation of the plunger, it may be made non-circular, some stationary element being provided with a non-circular passage to fit the plunger. To provide for the angular movement, the plunger may be provided with cut away portions or notches which permit the partial rotation above referred to.

The nut 19 is here shown as being provided with a web or flange 24 which abuts against the end 25 of the guide tube 17. This web or flange is provided with an aperture 26 which is non-circular, as shown at 27; and in assembling the device, it is preferable that this inwardly projecting portion of the web be placed at the top. The plunger 21 is milled or otherwise provided with a flat surface 28 and the hole in the nut is of proper outline to permit the plunger to freely slide in it. A number of notches 29 are cut into the body of the plunger at regular intervals. All these notches are preferably placed on one side of the plunger and extend in one direction from the flattened surface. From Figs. 3 and 4 it appears that the depth of these notches gradually diminishes and also that they taper in width.

When the device described is mounted on the instrument board of the automobile, one may readily adjust the opening of the shutter by seizing the grip 23 and pulling on the plunger. The notches 29 will come to view and the plunger may be turned to the right so as to pass the inwardly projecting portion 27 of the web or flange into the notch selected. Inasmuch as the notches taper either in depth, or width, or both ways, it is obvious that by twisting the plunger far enough, one may jam the plunger and nut together, so that the parts should become firmly locked and unlikely to loosen from any amount of vibration which may be brought about. Since the threading on the guide tube is also right handed it is obvious that there is no tendency to loosen the tube from the instrument board. By tapering the width of the notches, it is also possible to make it easy to feel out and locate the notch in adjusting the device.

According to the modified form of the invention illustrated in Figures 8 and 9, the guide tube 30 is cut on the front end as indicated at 31 and 32, and a prong 33 is bent inwardly. This prong may function in the same manner as the fin 27 carried on the nut 19. It will guide the plunger and will enter the notches to hold the plunger in place. This guide tube may be mounted on the instrument board 16 by means of nuts 34 and 35.

It is of course obvious that other forms of non-circular plungers might be used, and that the non-circular portion may be outside the diameter of the plunger, as well as provided by cutting off the side of the plunger. It is also obvious that the tapered part may be stationary instead of using tapered slots in the plunger.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

1. A control device for automobile radiator shutters, comprising, a stationary tubular guide adapted to be mounted on the instrument board of the automobile, and a plunger accessible from the front of the instrument board and carried in the guide, the plunger and guide having cooperative devices to permit axial movement of the plunger only when in a predetermined angular position and to permit angular movement of the plunger only when in predetermined positions along the axis of the guide, said devices having such configuration as to effect a wedging action and cause binding of the parts when the plunger is turned to the limit of its angular movement.

2. A control device for automobile radiator shutters, comprising, a stationary tubular guide mounted on the instrument board of the automobile, and a plunger accessible from the front of the instrument board and carried in the guide, the plunger and guide having cooperative devices to permit axial movement of the plunger only when in a predetermined angular position and to permit angular movement of the plunger only when in predetermined positions along the axis of the guide, said devices having such configuration as to effect a wedging action and cause binding of the parts when the plunger is turned to the limit of its angular movement, said devices being visible from the front of the instrument board when the plunger is partially withdrawn from the guide.

3. A control device for automobile radiator shutters, comprising, a stationary tubular guide of circular cross section mounted on the instrument board of the automobile, and a plunger of non-circular cross section accessible from the front of the instrument board, and removably carried in the guide, the plunger and guide having cooperative devices to permit axial movement of the plunger only when in a predetermined angular position and to permit angular movement of the plunger only when in predetermined positions along the axis of the guide, said devices having such configuration as to effect a wedging action and cause binding of the parts when the plunger is turned to the limit of its angular movement, said devices being visible from the front of the instrument board when the plunger is partially withdrawn from the tube.

4. A control device for automobile radiator shutters, comprising, a stationary tubular guide mounted on the instrument board of the automobile, and a plunger of generally circular cross section and having a non-circular portion, and a plurality of notches extending laterally from the non-circular portion thereof part way around the plunger, said plunger being accessible from the front of the board and slidably carried in the guide, the guide being provided with a non-circular member cooperative with the plunger to permit axial movement of the plunger only when the non-circular parts are aligned and to permit angular movement of the plunger only when the notches are adjacent the extent of said angular movement being limited by the angular length of the notches.

5. In an automobile, a radiator shutter mounted in front of the radiator, and normally held closed by spring means, a control device mounted on the instrument board, and a member connecting the control device and the shutter for pulling the shutter open against the tension of the spring means, said control device including a guide mounted on the instrument board, and a plunger slidably and revolvably carried in the guide, the plunger having a plurality of notches to receive a member carried by the guide, the notches and member having such configuration that the plunger may be turned only a partial revolution whereupon the parts jam, said jamming action being effective to prevent loosening of the parts by vibration.

6. In an automobile, a radiator shutter mounted in front of the radiator and normally held closed by spring means, a control device mounted on the instrument board, and a member connecting the control device and the shutter for pulling the shutter open against the tension of the spring means, said control device including a guide mounted on the instrument board, and a plunger slidably carried in the guide, the plunger and guide having non-yielding devices adapted to be wedged together for interlocking them in predetermined positions independent of the pull of the shutter spring, the wedging action being effective to prevent loosening of the parts by vibration.

7. In an automobile, a radiator shutter mounted in front of the radiator and normally held closed by spring means, a control device mounted on the instrument board, and a member connecting the control device and the shutter for pulling the shutter open against the tension of the spring means, said control device including a guide mounted on the instrument board, and a plunger slidably carried in the guide, the plunger having a plurality of notches visible when the plunger is partially withdrawn from the guide, the guide having a rigid part past which a notch may be turned and against which it is jammed to hold the plunger against the pull of the spring and prevent loosening of the parts by vibration.

8. In an automobile, a radiator shutter mounted in front of the radiator and normally held closed by spring means, a control device mounted on the instrument board, and a member connecting the control device and the shutter for pulling the shutter open against the tension of the spring means, said control device including a guide mounted on the instrument board and held against lateral movement, the guide having a rigid part past which a notch in the plunger may be turned angularly, the notch and said part being capable of being wedged together to hold the part in adjustment independent of the pull of the shutter spring.

9. A control device for radiator shutters, comprising a stationary tubular guide adapted to be mounted on the instrument board of an automobile, an interiorly projecting fin carried on the front end of the guide, and a plunger carried in the guide and having a cut away portion to accommodate the fin and permit reciprocation along the guide, the plunger also having notches extending laterally from the cut away portion, the fin being adapted to enter a notch when the plunger is moved angularly to hold the plunger in position, the notch and fin having such configuration as to effect a wedging action and cause binding of the parts.

10. A control device for radiator shutters, comprising an externally threaded stationary tubular guide, a pair of nuts for mounting it on the instrument board of an automobile, the nut on the front of the board having a fin projecting into the guide, and a plunger carried in the guide, the plunger being flattened on one side to accommodate the fin and permit axial movement of the plunger only when in one angular position, the plunger being further provided with notches extending laterally from the flattened side thereof and into which the fin enters when the plunger is turned angularly.

11. A control device for radiator shutters, comprising an externally threaded stationary tubular guide, a pair of nuts for mounting it on the instrument board of an automobile, the nut on the front of the board having a fin projecting into the guide, and a plunger carried in the guide, the plunger being flattened on one side to accommodate the fin and permit axial movement of the plunger only when in one angular position, the plunger being further provided with notches extending laterally from the flattened side thereof and into which the fin enters when the plunger is turned angularly, said notches being tapered so that the parts jam when the limit of the angular movement is reached.

12. A control device for an automobile radiator shutter or the like, comprising a stationary tubular guide secured to the instrument board of an automobile, a plunger closely fitting in the tubular guide and being rotatably and slidably carried therein, and an inwardly projecting stationary fin, the plunger being of general cylindrical shape and having a flat side and a plurality of notches formed in the cylindrical plunger and laterally extending from the flat side part way around the plunger, the fin engaging the flat side to permit sliding of the plunger when in one angular position and engaging in one of the notches of the plunger when the plunger is angularly turned from said position for locking the plunger against longitudinal movement in either direction.

WILLIAM A. ALLEN.